United States Patent
Ditzler et al.

(10) Patent No.: US 8,944,717 B2
(45) Date of Patent: Feb. 3, 2015

(54) INTEGRATED PIVOT PIN LUBRICATOR

(71) Applicant: Deere & Company, Moline, IL (US)

(72) Inventors: Steven J. Ditzler, Bellevue, IA (US);
Peter D. Zach, Dubuque, IA (US);
Jonathan R. Hunt, Garnavillo, IA (US)

(73) Assignee: Deere & Company, Moline, IL (US)

( * ) Notice: Subject to any disclaimer, the term of this patent is extended or adjusted under 35 U.S.C. 154(b) by 54 days.

(21) Appl. No.: 13/693,373

(22) Filed: Dec. 4, 2012

(65) Prior Publication Data

US 2014/0153997 A1 Jun. 5, 2014

(51) Int. Cl.
*F16C 11/04* (2006.01)
*F01M 11/00* (2006.01)
*F16C 33/10* (2006.01)

(52) U.S. Cl.
CPC .............. *F01M 11/00* (2013.01); *F16C 11/045* (2013.01); *F16C 33/1085* (2013.01)
USPC .............. 403/38; 403/153; 403/157; 403/161

(58) Field of Classification Search
CPC .. F16C 11/045; F16C 33/102; F16C 33/1025; F16C 33/1045; E02F 3/3604; E02F 3/3663; E02F 3/3609; E02F 3/3677; E02F 9/006
USPC ................ 403/34, 37–39, 150–163; 414/723; 37/468
See application file for complete search history.

(56) References Cited

U.S. PATENT DOCUMENTS

| | | | | |
|---|---|---|---|---|
| 1,923,717 A | * | 8/1933 | Frelin | 184/6.5 |
| 1,999,394 A | * | 4/1935 | Burnett | 280/93.512 |
| 2,439,569 A | * | 4/1948 | Hathorn | 464/14 |
| 2,726,107 A | * | 12/1955 | Kasten | 403/24 |
| 2,847,238 A | * | 8/1958 | Bolling, Jr. | 403/154 |
| 3,295,699 A | | 1/1967 | Bauernschub, Jr. | |
| 3,616,940 A | | 11/1971 | Milner, Jr. | |
| 4,260,064 A | | 4/1981 | Ekstam | |
| 4,398,862 A | * | 8/1983 | Schroeder | 414/723 |
| 4,607,977 A | * | 8/1986 | Varnelis et al. | 403/154 |
| 4,609,322 A | * | 9/1986 | Quant | 414/685 |
| 4,711,614 A | * | 12/1987 | Erker et al. | 414/641 |
| 4,858,962 A | * | 8/1989 | Bolling et al. | 285/121.7 |
| 4,923,320 A | * | 5/1990 | Klischat | 403/5 |
| 4,961,667 A | * | 10/1990 | Reinsma et al. | 403/11 |
| 5,211,484 A | * | 5/1993 | Quaglia | 384/322 |

(Continued)

FOREIGN PATENT DOCUMENTS

IN 239227 9/2011

OTHER PUBLICATIONS

Images of Deere Boom (2 pages) (admitted as prior art before Sep. 20, 2011).

(Continued)

*Primary Examiner* — Joshua Kennedy
(74) *Attorney, Agent, or Firm* — Faegre Baker Daniels LLP

(57) ABSTRACT

An apparatus for lubrication of a hinge on a work machine. The hinge includes a first member such as a first boom arm and a second member such as a second boom arm. The hinge further includes a pin hingedly linking the first and second members. The pin has a path therein having a first portion that extends axially. The hinge further includes a port in fluid communication with the path. The port is radially offset by a fixed distance and fixed orientation from the first portion within the pin.

22 Claims, 3 Drawing Sheets

(56) References Cited

U.S. PATENT DOCUMENTS

| | | | | |
|---|---|---|---|---|
| 5,601,161 | A * | 2/1997 | Brigden | 188/83 |
| 5,769,557 | A * | 6/1998 | Beals et al. | 403/162 |
| 5,806,313 | A | 9/1998 | Koshi et al. | |
| 6,135,242 | A * | 10/2000 | Hockley | 188/1.11 R |
| 6,322,280 | B1 | 11/2001 | Coyne | |
| 6,443,196 | B1 | 9/2002 | Kurelek | |
| 6,612,051 | B2 | 9/2003 | Weyer et al. | |
| 6,872,043 | B2 | 3/2005 | Yukawa et al. | |
| 7,008,169 | B1 | 3/2006 | Miyanishi | |
| 7,722,305 | B2 * | 5/2010 | Faith et al. | 411/351 |
| 7,748,908 | B2 * | 7/2010 | Aira et al. | 384/385 |
| 8,506,272 | B2 * | 8/2013 | Fan et al. | 418/88 |
| 8,596,666 | B1 * | 12/2013 | Hansen et al. | 280/515 |
| 2010/0158601 | A1 * | 6/2010 | Salas Madrid et al. | 403/38 |
| 2012/0241404 | A1 | 9/2012 | Bobeck | |

OTHER PUBLICATIONS

Background Information (1 page) (admitted as prior art before Sep. 20, 2011).
Report of Indian Design Patent No. 239227 (1 page) (Sep. 5, 2011).
International Search Report and Written Opinion mailed Mar. 28, 2013 of International Patent Application No. PCT/US2013/024155.
International Search Report and Written Opinion mailed Apr. 29, 2013 of International Patent Application No. PCT/US2013/024413.
International Search Report and Written Opinion mailed May 3, 2013 of International Patent Application No. PCT/US2013/024146.

* cited by examiner

INTEGRATED PIVOT PIN LUBRICATOR

FIELD

The present disclosure relates to lubrication of pivot pins of work machines and, more particularly, to lubrication of pivot pins via internal lubrication paths.

BACKGROUND

To fell and process trees, an operator may use a tree harvester having a harvester head moveably coupled to a wheeled or tracked chassis via a boom assembly. Additionally, other work machines also include boom assemblies. Such boom assemblies include multiple boom sections (or arms) that are pivotably mounted to each other via pivot pins. Similarly, hydraulic cylinders are coupled to boom sections via pivot pins. Due to the relative movement of the boom arms and their pivot pins, such connections are lubricated to reduce wear and increase part life. The boom arms can be positioned such that access to the locations needing lubrication can be onerous. Additionally, manual lubrication requires that the work machine be taken out of service for a portion of time while such lubrication maintenance is performed.

SUMMARY

The present disclosure provides a hinge on a work machine. The hinge includes a first member such as a first boom arm and a second member such as a second boom arm. The hinge further includes a pin hingedly linking the first and second members. The pin has a path therein having a first portion that extends axially. The hinge further includes a port in fluid communication with the path. The port is radially offset by a fixed distance and fixed orientation from the first portion within the pin.

According to an embodiment of the present disclosure, a hinge lubrication apparatus is provided including a first hinge member, a second hinge member, a hinge pin operable to hingedly couple the first and second members, and a lubricant supply path. The hinge pin has a lubrication path therein. The lubricant supply duct is operable to supply lubricant to the lubrication path via a connection port fixed to the first hinge member that is in fluid communication with the lubrication path. The connection port is positioned such that connection thereto by the lubricant supply duct is on an interior of the first hinge member.

According to another embodiment of the present disclosure, a hinge pin is provided including a pin body and a second body. The second body having a first portion axially aligned with the pin body; a second portion radially displaced relative to the first portion; and a lubrication path that extends from the first portion to the second portion.

According to yet another embodiment of the present disclosure, a hinge lubrication apparatus for a work machine including a first hinge member, a second hinge member operably coupled to a work machine cab via the first hinge member; a hinge pin operable to hingedly couple the first and second members; and a lubrication path including a lubrication port fixed to the first hinge member, a first portion within the hinge pin, and a second portion extending between the lubrication port and the first portion; the second portion defining a rigid path.

BRIEF DESCRIPTION OF THE DRAWINGS

The above-mentioned and other features and advantages of this disclosure, and the manner of attaining them, will become more apparent and the disclosure itself will be better understood by reference to the following description of embodiments of the disclosure taken in conjunction with the accompanying drawings, wherein.

Corresponding reference characters indicate corresponding parts throughout the several views. The exemplifications set out herein illustrate exemplary embodiments of the disclosure and such exemplifications are not to be construed as limiting the scope of the invention in any manner.

DETAILED DESCRIPTION

Figure 1:
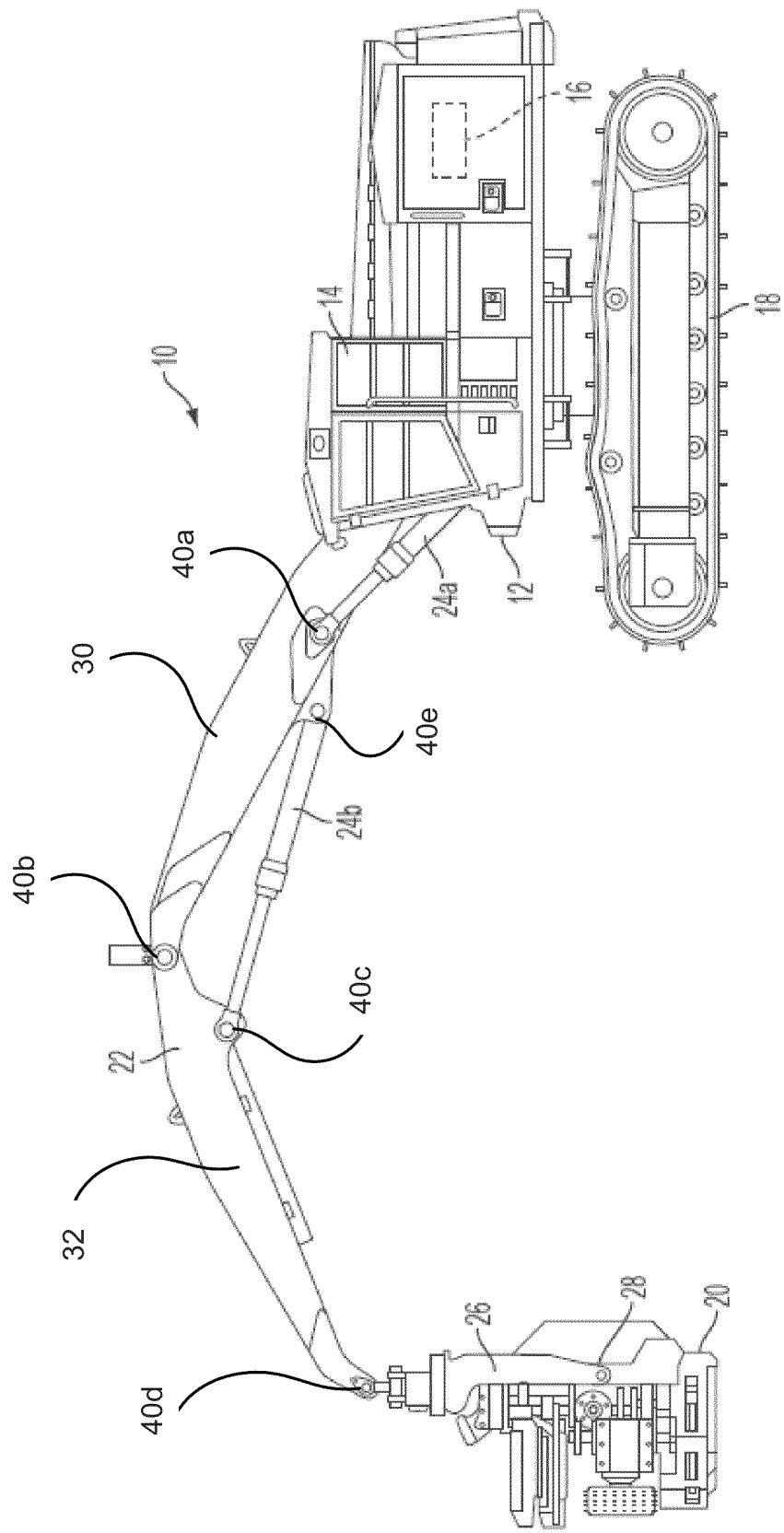
FIG. 1 is a side elevational view of a harvester of the present disclosure, the harvester having a tracked chassis and a harvester head moveably coupled to the chassis via a hinged boom.

Referring to FIG. 1, a tracked harvester 10 of the present disclosure illustratively includes a carrier or chassis 12 and an operator cab 14 that houses and protects the operator of harvester 10. Operator cab 14 may include foot pedals, a steering wheel, joysticks, monitors, and other controls (not shown) for operating harvester 10.

Harvester 10 also includes engine 16. Engine 16 may be in the form of an internal combustion engine or an electric engine, for example. Harvester 10 further includes a plurality of traction devices, illustratively ground-engaging tracks 18, for supporting chassis 12 above the ground. In use, engine 16 drives tracks 18 to propel chassis 12 of harvester 10 across the ground. Although harvester 10 is shown and described herein using tracks 18 as the fraction devices, it is within the scope of the present disclosure that other types of harvesters 10 may be used, such as wheeled harvesters that use wheels as the traction devices. Similarly, while the present disclosure is described in the environment of a harvester, it should be appreciated that the concepts can be applied to work machines with articulation points generally.

Harvester 10 still further includes a forward-mounted harvester head 20 that is configured to fell and process trees. Head 20 is moveably coupled to chassis 12 via boom assembly 22, which enables head 20 to be raised, lowered, and tilted relative to chassis 12 to position head 20 at a desired position relative to a tree to be felled. First and second hydraulic boom cylinders 24a, 24b, are shown in FIG. 1 for moving boom assembly 22 relative to chassis 12. Head 20 is also moveably coupled to support arm 26 of boom assembly 22. For example, as shown in FIG. 1, head 20 may be positioned upright or vertically on support arm 26 to fell a tree, and then head 20 may be tipped downward or horizontally relative to support arm 26 about axis 28 for further processing of the felled tree, including delimbing and chopping operations. A third hydraulic boom cylinder (not shown) may be provided for moving head 20 about axis 28 relative to support arm 26 of boom assembly 22.

Boom assembly 22 includes first arm 30 and second arm 32 in addition to the previously mentioned cylinders 24a, 24b. Each of first arm 30, second arm 32, support arm 26, and cylinders 24a, 24b are coupled together at connection points 40a-e. Connection points 40a-e each include pins 50 that engage voids defined in the respective parts 30, 32, 26, 24a, 24b. Accordingly, with respect to the hinges formed, first arm 30, second arm 32, support arm 26, and cylinders 24a, 24b all act as hinge members that are hingedly coupled by pins 50.

Figure 2:
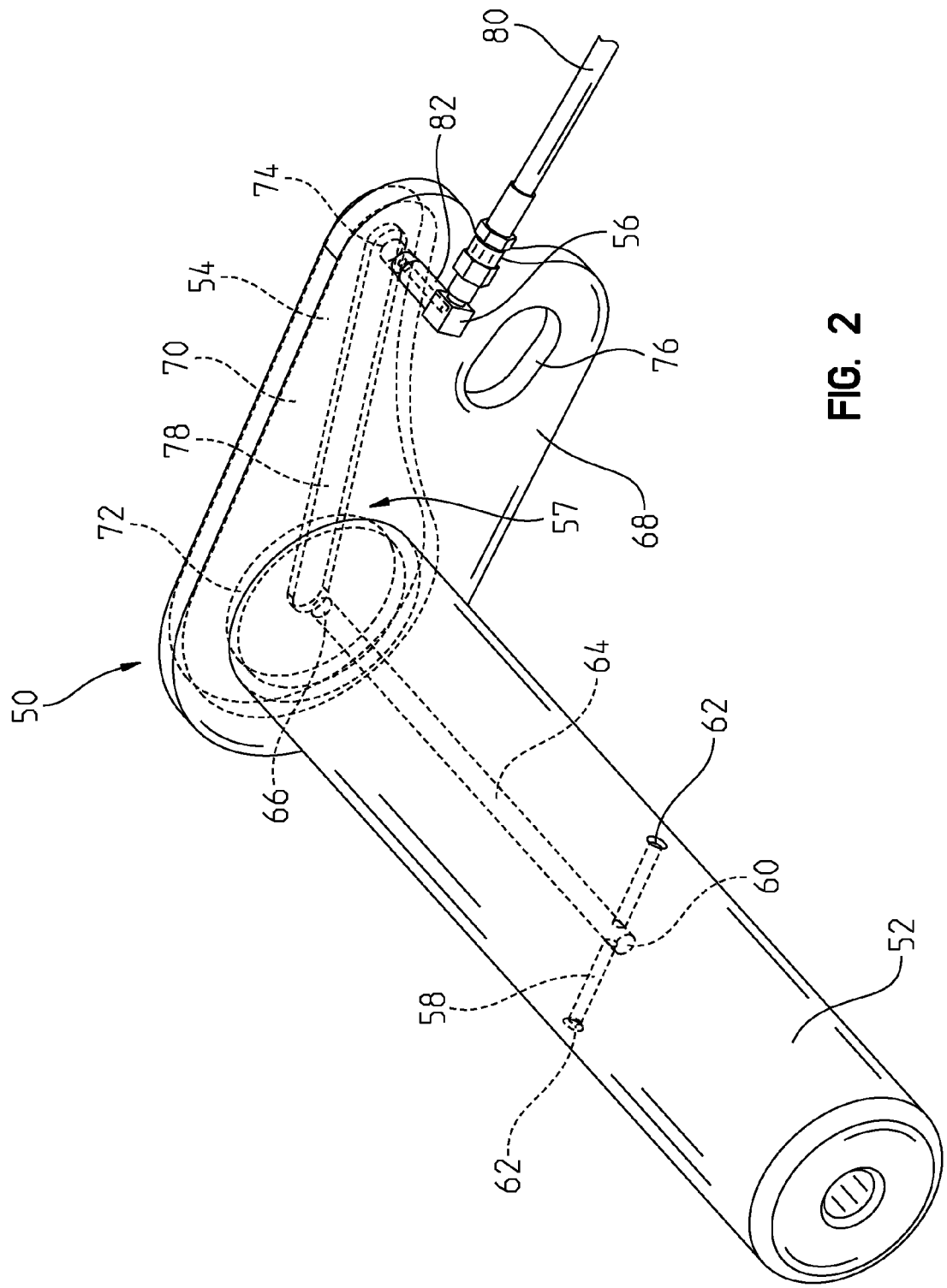
FIG. 2 is a partially transparent perspective view of a hinge pin of a hinge of the harvester of FIG. 1 showing internal lubrication passages.

As shown in FIG. 2, each pin 50 includes cylindrical bearing member 52, flag 54, and lubrication port 56. Pin 50 further includes an internal lubrication pathway 57. Cylindrical bearing member 52 includes first portion 58 of lubrication pathway 57. First portion 58 extends radially from an internal point 60 to the outer surface creating two exit points 62. Internal point 60 provides an interface with second portion 64 of lubrication pathway 57 that extends axially from internal point 60 to an axial end 66 of cylindrical bearing member 52.

Figure 3:
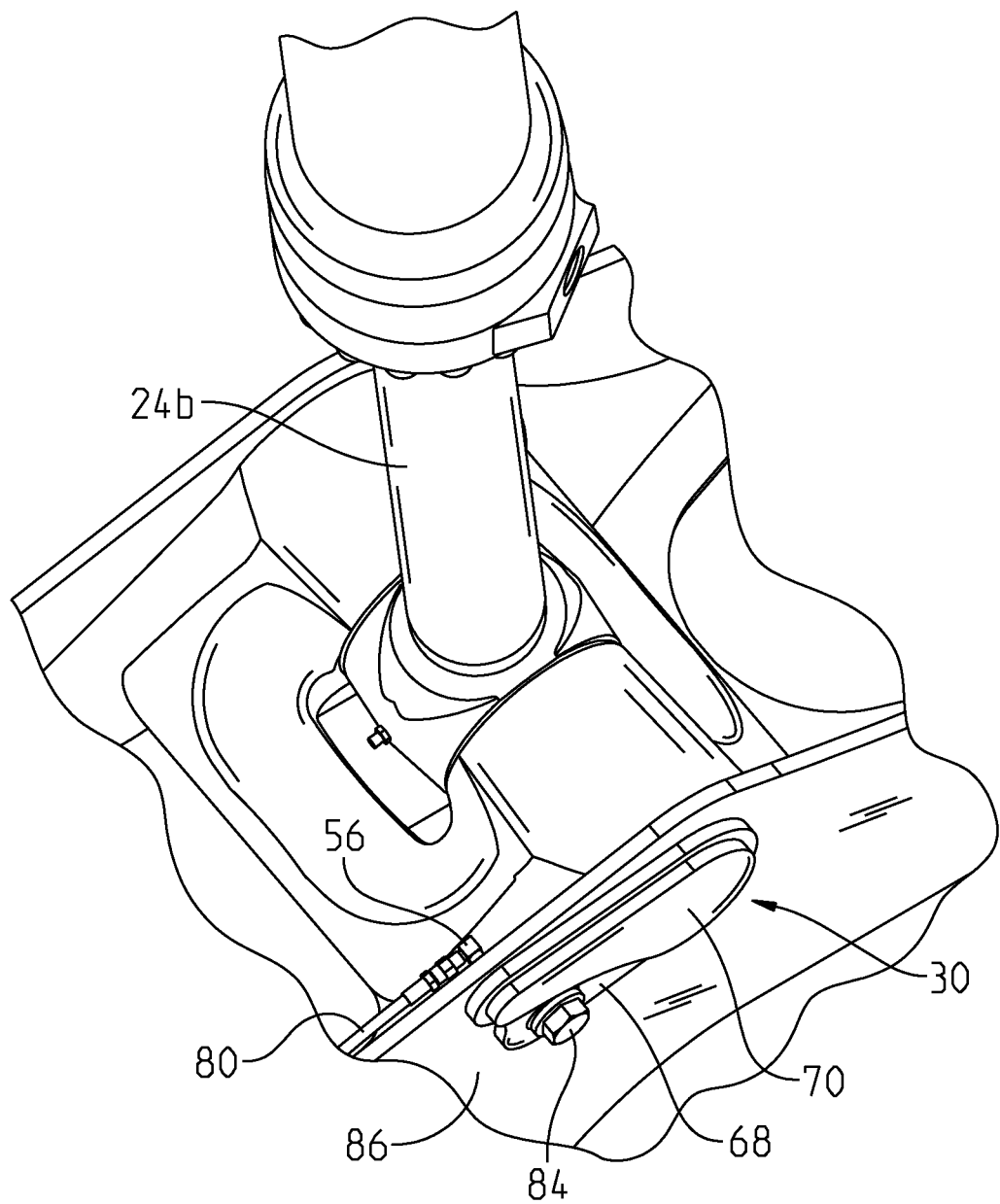
FIG. 3 is a bottom perspective view of the hinge employing the hinge pin of FIG. 2.

Flag 54 provides for coupling pin 50 to arm 30. Flag 54 includes coupling plate 68 and pathway plate 70. Coupling plate 68 includes bearing aperture 72, port aperture 74, and bolt aperture 76. Coupling plate 68 is fixedly secured to cylindrical bearing member 52 such as by welding cylindrical bearing member 52 within bearing aperture 72 or welding such that an end of cylindrical bearing member 52 abuts coupling plate 68. Pathway plate 70 includes a third portion 78 of lubrication pathway 57 therein. Pathway plate 70 is coupled to coupling plate 68, such as by welding, such that third portion 78 of lubrication pathway 57 is formed therebetween with at least one wall of third portion 78 being defined by coupling plate 68. Third portion 78 extends from axial end 66 of cylindrical bearing member 52 to port aperture 74. Bolt aperture 76 is positioned, sized, and shaped to receive bolt 84 therethrough to secure pin 50 to arm 26 as shown in FIG. 3.

Lubrication port 56 is disposed in an aperture in wall 86 of arm 30 so as to align with port aperture 74. The combination of port aperture 74, the aperture in wall 86, and lubrication port 56 provide fourth portion 82 of lubrication pathway 57 to place an input of lubrication port 56 in fluid connection with lubrication pathway 57. Lubrication port 56 includes a threaded interface such that port 56 is able to threadably receive lubrication duct 80. Accordingly, lubrication duct 80 is able to supply lubricant, via lubrication pathway 57, to surface points 62 of cylindrical bearing member 52. In the shown embodiment, lubrication port 56 provides a right-angle adapter such that lubrication duct 80 runs parallel to wall 86 of arm 30. However, embodiments are envisioned where the right-angle adapter is part of duct 80 such that lubrication port 56 is substantially straight.

In the provided example, second portion 64 extends axially along a center of cylindrical bearing member 52. Embodiments are envisioned where second portion 64 is offset from the center of cylindrical bearing member 52. Third portion 78 extends perpendicularly to second portion 64 and radially relative to cylindrical bearing member 52. Third portion 78 is further shown as being parallel to first portion 58. Fourth portion 82 is illustratively perpendicular to third portion 78, parallel to second portion 64, and perpendicular to first portion 58. While the shown embodiment of internal lubrication pathway 57 has portions extending perpendicularly to each other, embodiments are envisioned where portions extend at non-right angles relative to each other. Such angles can be chosen to achieve desired flow characteristics.

When pin 50 is coupled to first arm 30, first hydraulic boom cylinders 24a, or other connection points 40a, lubrication port 56 is disposed on an interior surface of first arm 30 (or other arm to which connection is being supplied). Accordingly, the walls of first arm 30 provide some protection for lubrication duct 80.

Overall, internal lubrication pathway 57 provides for a fixed connection point on a hinge member (arm 30) that is able to supply lubrication to pin 50 via the interior of cylindrical bearing member 52. Furthermore, the fixed connection point provides that portions of the lubrication pathway (from supply reservoir, not shown, to exit points 62) is able to be located in positions that are protected, either by walls 86 of arms 30 or otherwise.

While this invention has been described as having preferred designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this disclosure pertains and which fall within the limits of the appended claims.

The invention claimed is:

1. A hinge on a work machine comprising:
    a first member;
    a second member;
    a generally cylindrical pin hingedly linking the first and second members, the pin having a fluid path therein, the pin having a first portion of a fluid path that extends axially therein, the path having a second portion outside of the pin within a radially extending pin flag secured to an end face of the pin, and
    the pin flag further comprising a port in fluid communication with the second portion of the path and operable to couple to a fluid supply, the port being radially offset by a fixed distance and fixed orientation from the first portion.

2. The hinge of claim 1, wherein the second portion has a first end that is in fluid communication with the first portion and a second end that is in fluid communication with the port.

3. The hinge of claim 1, wherein the second portion extends perpendicularly to the first portion.

4. The hinge of claim 1, further including a retainer that restricts axial movement of the pin, the second portion being disposed within the retainer.

5. The hinge of claim 1, wherein the second portion of the fluid path has a radially outward end fluidly connected to the port at a connection point spaced radially away from the pin.

6. A hinge lubrication apparatus including:
    a first hinge member,
    a second hinge member,
    a hinge pin operable to hingedly couple the first and second members, the hinge pin having a first lubrication path extending axially therein;
    a pin flag secured to an end face of the hinge pin, the pin flag having a second lubrication path extending radially from the first lubrication path;
    a lubricant supply path operable to supply lubricant to the first and second lubrication paths via a connection port fixed to the first hinge member that is in fluid communication with the first and second lubrication paths, the connection port being positioned such that connection thereto by the lubricant supply path is on an interior of the first hinge member.

7. The apparatus of claim 6, wherein the hinge pin is cylindrical, having a first base, a second base, and a height.

8. The apparatus of claim 7, wherein the lubrication supply path interfaces with the lubrication path at the first base of the cylindrical hinge pin.

9. The apparatus of claim 6, wherein the combination of first hinge member, second hinge member, and hinge pin define an overall first width at the point of coupling.

10. The apparatus of claim 9, wherein a lubricant supply duct is coupled to the lubrication path via the connection port such that the overall width of the combination of first hinge member, second hinge member, hinge pin, and lubricant supply duct is not greater than the first width.

11. The apparatus of claim 6, wherein the lubricant supply path has rigid walls that define a fixed flow path.

12. The apparatus of claim 6, wherein the first hinge member comprises a first boom arm and the second hinge member comprises a second boom arm.

13. The apparatus of claim 6, wherein the first boom arm comprises a pair of walls defining the interior of the first hinge member, the connection port positioned on an interior surface of one of the pair of walls.

14. A hinge pin comprising:
 a pin body having an internal lubrication path extending to an axial end face;
 a second planar body secured to the end face of the pin body having:
  a first port axially aligned and communicating with the lubrication path of the pin body; and
  a second port radially displaced relative to the first portion and the pin body; and
 an internal lubrication path that extends from the first port to the second port.

15. The hinge pin retainer of claim 14, wherein the second body defines a plane and the lubrication path extends parallel to the plane.

16. The hinge pin retainer of claim 14, further including an arm to which the hinge pin is coupled and wherein the lubrication path is aligned with a first passage through the arm at the first portion of the second body and a second passage through the arm at the second portion of the second body.

17. The hinge pin retainer of claim 14, further comprising a lubrication port radially spaced from the pin body, the lubrication path connected to the lubrication portion proximate the second portion of the second body.

18. A hinge lubrication apparatus for a work machine comprising:
 a first hinge member including a lubrication port fixed thereto;
 a second hinge member adapted to couple to a work machine cab via the first hinge member;
 a hinge pin hingedly coupling the first and second members such that the first hinge member is moveable with respect to the second hinge member, the hinge pin comprising;
 a pin body;
 a radially extending planar body secured to an end face of the pin body; and an internal lubrication path comprising a first portion within the pin body, and a second portion defining a rigid path within the radially extending planar body and being fluidly connected to the lubrication port and the first portion at radially spaced points.

19. The apparatus of claim 18, wherein the second portion is fixed relative to the first hinge member.

20. The apparatus of claim 18, wherein the second portion is defined in a hinge pin retainer.

21. The apparatus of claim 18, wherein the second portion defines a longitudinal axis that extends perpendicularly to an axis of rotation of the hinge pin.

22. The apparatus of claim 18, wherein the lubrication port is radially spaced from the hinge pin, such that the second portion of the lubrication path extends radially outwardly away from the first portion and the hinge pin.

* * * * *